Feb. 28, 1950

R. McVAY 2,498,815

FISHING TACKLE

Filed April 20, 1948

INVENTOR.
RAYMON McVAY

BY

McMorrow, Berman & Davidson
ATTORNEYS

Patented Feb. 28, 1950

2,498,815

UNITED STATES PATENT OFFICE 2,498,815

FISHING TACKLE

Raymon McVay, Denison, Tex.

Application April 20, 1948, Serial No. 22,230

3 Claims. (Cl. 43—43.11)

This invention relates to improvements in fishing tackle, and more particularly to an improved weight and bobber assembly for use in casting.

It is among the objects of the present invention to provide an improved weight and bobber assembly for use in fishing, wherein the weight serves as an auxiliary reel for carrying the leader until a cast is completed and the bobber serves as a guard for the weight, leader, hook and bait during casting, and as a depth-control device for the hook after the cast is completed, wherein the leader is automatically unwound from the weight upon completion of the cast, wherein the weight is completely receivable in the bobber, and wherein the weight and bobber assembly is simple, durable and economical in construction, easy to use, and neat and attractive in appearance.

Other objects and advantages will become apparent from a consideration of the following description and appended claims in conjunction with the accompanying drawing, wherein:

Figure 1:
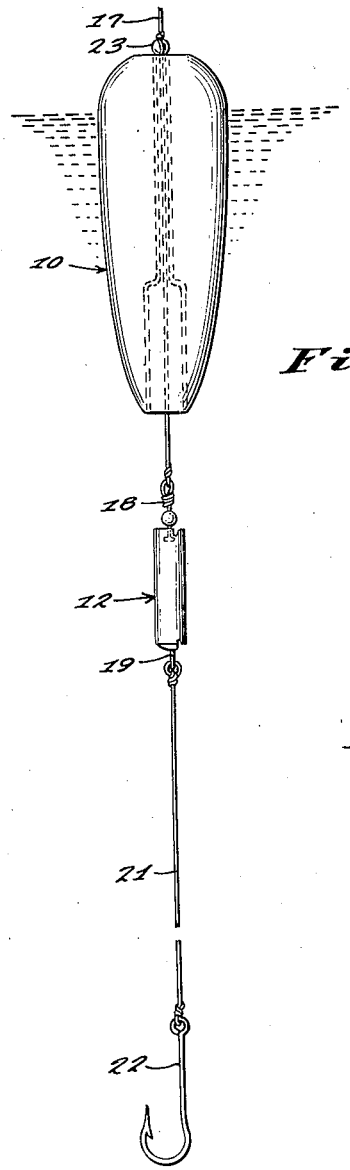
Figure 1 is a longitudinal elevation of a hook and bobber assembly illustrative of the invention, showing a fishing line, leader and hook operatively attached to the assembly and the two parts of the assembly separated in operative position for fishing.

With continued reference to the drawing, the improved assembly comprises a bobber, generally indicated at 10, and a weight, generally indicated at 12.

The bobber 10 is an elongated buoyant body, preferably of circular cross-section having one end spherically rounded and the opposite end tapered to provide a body of smooth, streamlined contour which is easy to cast and which, when floating on the water, will be sensitive to the action of fish attacking the bait suspended therefrom. This body may be formed of buoyant material, such as wood or cork or may be formed of other material and made hollow to render it buoyant. A bore 14 extends through the elongated body 13 with its longitudinal centerline substantially coincident with the longitudinal centerline of the body and is provided in the tapered end of the body with a counterbore 15. Preferably a liner 16 is provided in the bore 14 and counterbore 15 which lining may be formed of any suitable materials, such as thin metal or synthetic resin plastic. The diameter of the bore is such as to provide for the passage of a fishing line 17 therethrough so that the line is freely slidable in the bore, while the diameter of the counterbore 15 is approximately one-third the maximum diameter of the body 13, and the length of the counterbore substantially one-third the length of the body. It is to be understood, however, that the size and shape of the counterbore 15 may be varied to accommodate a weight 12 of any particular size and shape desired, as it is particularly desirable that the counterbore entirely receive the weight and that the weight substantially fills the counterbore when received therein.

Figure 2:
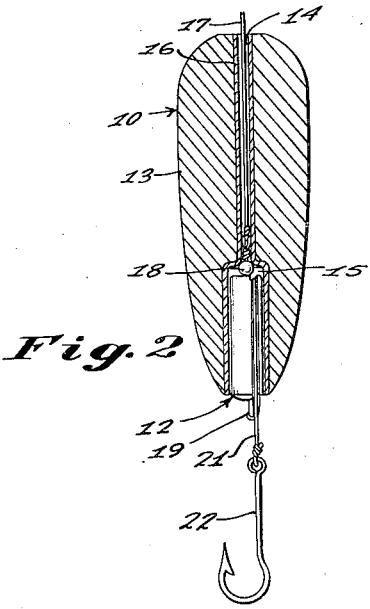
Figure 2 is a longitudinal cross-section of the assembly showing the two parts of the assembly telescopically associated for casting.
Figure 3:
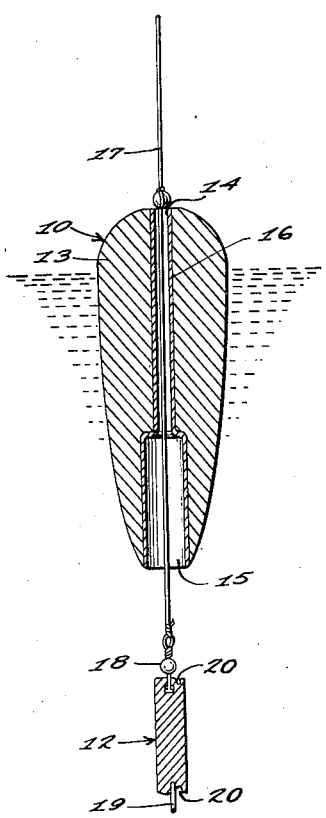
Figure 3 is a longitudinal medial cross-section of the assembly in the operative position shown in Figure 1.

The weight 12 is an elongated, cylindrical body of some sinkable material, such as lead, and has a swivel connection 18 secured in one end and an eye 19 secured in the opposite end thereof. The swivel connection and eye may conveniently be secured to the weight by having portions thereof embedded in the weight while the material of the weight is in a molten condition during casting of the same. The weight is provided in each of its opposite ends with a respective groove or notch 20 to receive a leader 21 attached to the weight by the eye 19, when the leader is wound upon the weight, as illustrated in Figure 2. A hook 22 and suitable lure or bait, not illustrated, is connected to the end of the leader opposite the eye 19 and the line 17 is connected to a conventional rod and reel, not illustrated.

In using the improved assembly, the proper depth for the hook is first estimated and a knot 23 is formed in the line at a position such that the hook 22 will be suspended the desired distance below the upper end of the bobber 10. The provision of this knot may be facilitated by inserting a grooved shot-weight therein, which shot-weight is of a size such that it will not pass through the bore 14 of the bobber. The leader 21 is then wound upon the weight 12 and the line 17 withdrawn through the bobber until the weight is completely received in the counterbore 15 of the bobber, as illustrated in Figure 2 with the hook and bait extending only a short distance from the tapered end of the bobber. With this arrangement the hook will not tangle in the fishing line, nor is it likely to tangle with tree branches or other obstructions during the cast, and the bobber thus serves as a guard for the hook and for any bait which may be associated therewith. The assembly is cast with the parts in the relative position illustrated in Figure 2, and as soon as it strikes the water the bobber up-ends to the position shown in Figure 1 and the weight immediately falls out of the lower end of the bobber. The leader being formed of a relatively stiff or resilient material, such as wire or gut, immediately unwinds from the weight and suspends the hook below the weight, as shown in Figure 1, and the weight then pulls the line downwardly through the bobber until the knot 23 contacts the upper end of the bobber whereupon the hook will be suspended at the desired distance below the surface of the water.

Upon hooking a fish the line is reeled in by first drawing it up through the bobber until the weight is again received in the counterbore 15 in which position the bobber will assist in preventing the catch from becoming entangled in the line. Thereafter the fish is retrieved in the conventional manner.

The invention may be embodied in other specific forms without departing from the spirit or characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A fishing bobber and weight assembly comprising a bobber including an elongated, buoyant body having a longitudinal bore therethrough of a diameter to slidably receive a fishing line and a counterbore at one end of said bore, a liner in said bore and counterbore, a weight comprising a sinkable body of a size and shape to fit into said counterbore and substantially fill the latter, a swivel connection secured to one end of said weight to provide an attachment for a fishing line extending through the bore in said buoyant body, and an eye secured to the opposite end of said weight to provide an attachment for a fish hook leader, said weight having a notch in each opposite end thereof to receive the leader when the leader is wound thereon.

2. A fishing bobber and weight assembly comprising an elongated, buoyant body having an axial bore therethrough of a size to slidably receive a fishing line and a counterbore at one end of said bore, an elongated, sinkable body of a size and shape to fit into said counterbore, and a swivel connection secured to one end and an eye secured to the opposite end of said sinkable body, said sinkable body having its opposite ends shaped to receive a fishing leader secured at one end to said eye and wound about said body, and said swivel providing an attachment for a fishing line extending through the bore in said buoyant body.

3. A fishing bobber and weight assembly comprising an elongated, buoyant body of substantially circular cross-section and tapered toward one end thereof, said body having an axial bore therethrough of a size to slidably receive a fishing line and a cylindrical counterbore in the tapered end of said body, an elongated sinkable body of cylindrical shape and of a size to fit into said counterbore, and a swivel connection secured to one end and an eye secured to the opposite end of said cylindrical sinkable body, said sinkable body having its opposite ends shaped to receive a fishing leader secured at one end to said eye and wrapped about said body, and said swivel providing an attachment for a fishing line extending through the bore in said buoyant body.

RAYMON McVAY.

REFERENCES CITED

The following references are of record in the file of this patent:

UNITED STATES PATENTS

| Number | Name | Date |
|---|---|---|
| 1,766,532 | Pflueger | June 24, 1930 |
| 2,157,003 | Mussina | May 2, 1939 |